United States Patent [19]

Brown et al.

[11] 4,161,856

[45] Jul. 24, 1979

[54] SUSPENSION CEILING SYSTEM

[75] Inventors: Donald A. Brown, Westlake; Paul D. LaLonde, Avon Lake, both of Ohio

[73] Assignee: Donn Products, Inc., Westlake, Ohio

[21] Appl. No.: 741,738

[22] Filed: Nov. 15, 1976

[51] Int. Cl.² ............................................. E04C 2/42
[52] U.S. Cl. ................................... 52/667; 52/726; 52/729; 403/233
[58] Field of Search ................. 52/664, 665, 666, 667, 52/668, 669, 475, 476, 484, 488, 495; 403/326, 231, 233, 251, 219

[56] References Cited

U.S. PATENT DOCUMENTS

| | | | |
|---|---|---|---|
| 3,221,466 | 12/1965 | Downing | 52/669 |
| 3,286,427 | 11/1966 | Cotter | 52/495 |
| 3,292,332 | 12/1966 | Jahn | 52/484 |
| 3,321,882 | 5/1967 | Stahlhut | 52/484 |
| 3,342,515 | 9/1967 | Jahn | 52/664 |
| 3,511,012 | 5/1970 | Brady | 52/484 |

*Primary Examiner*—John E. Murtagh
*Attorney, Agent, or Firm*—McNenny, Pearne, Gordon, Gail, Dickinson & Schiller

[57] ABSTRACT

A suspension ceiling system is disclosed which includes main tee members and cross tee members which can be assembled in a variety of relationships. The main tee members are provided with similar first end connections at each end and the cross tee members are provided with similar second end connectors at each end. The main tee and cross tee members can be end connected to produce main runs consisting of alternate main tee members and cross tee members. The cross tees can also be assembled through openings provided in the webs of both types of members to produce cross runs consisting solely of cross tee members. In the illustrated embodiment the second end connectors of the cross tees can be connected in three ways. They can be connected to first end connectors of the main tees, connected through a cross tee opening without a similar second end connector extending from the other side and can be connected to a second end connector extending in the opposite direction through the same cross tee opening. The length of the main tees exceeds the grid module length by one face flange width and the length of the cross tees is less than the grid module length by one face flange width. The versatility of assembly permits the system to be marketed in packages consisting of a first predetermined number of cross tees and a second predetermined number of main tees for installation in areas or rooms having substantially different shapes. The illustrated embodiment also includes novel and improved panel locking means for holding panels against the face flanges of assembled grid systems.

11 Claims, 12 Drawing Figures

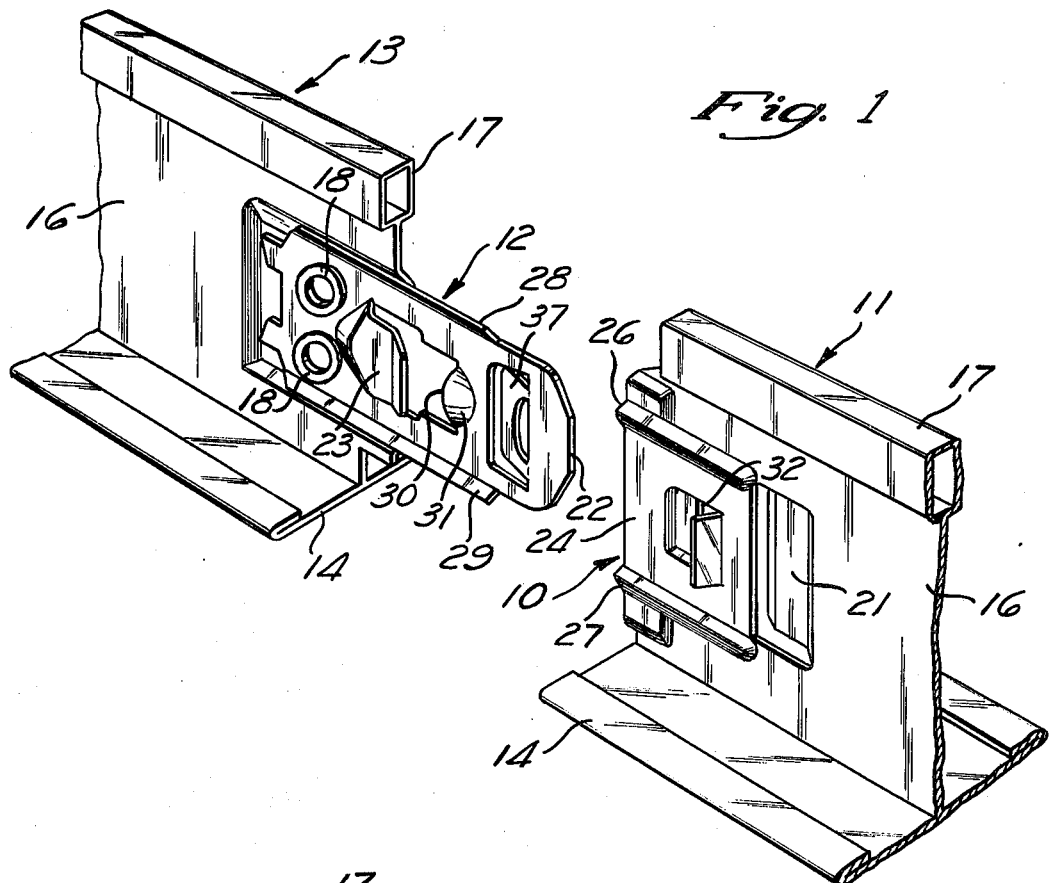
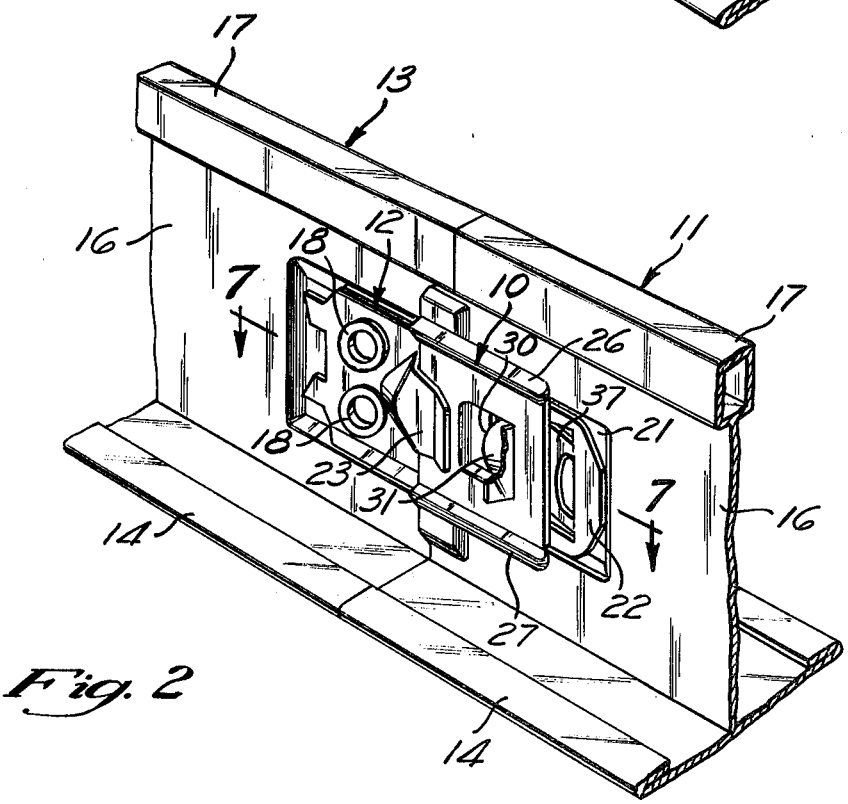

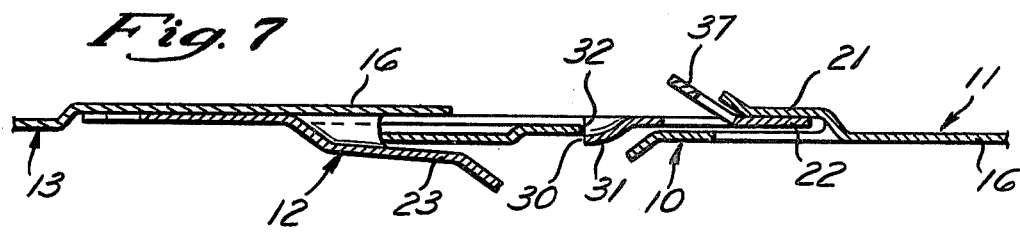
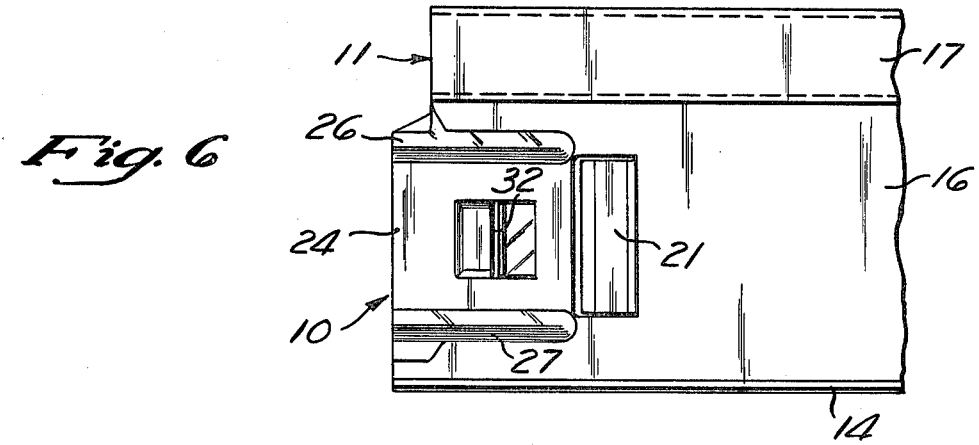
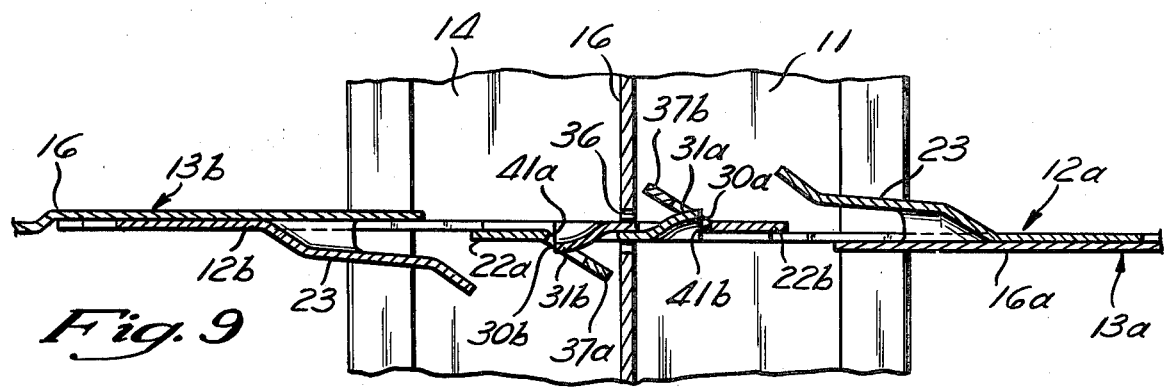
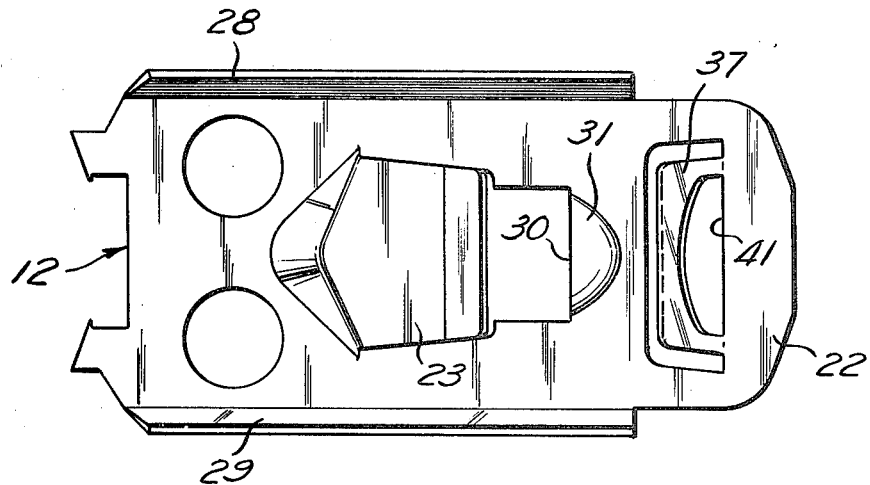

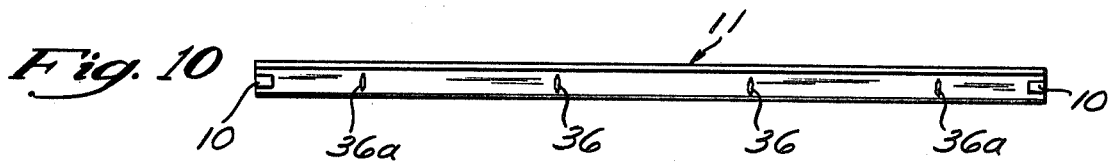
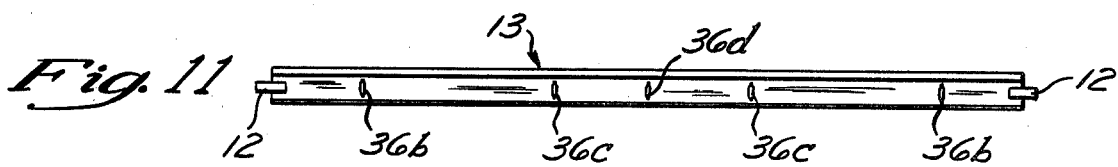
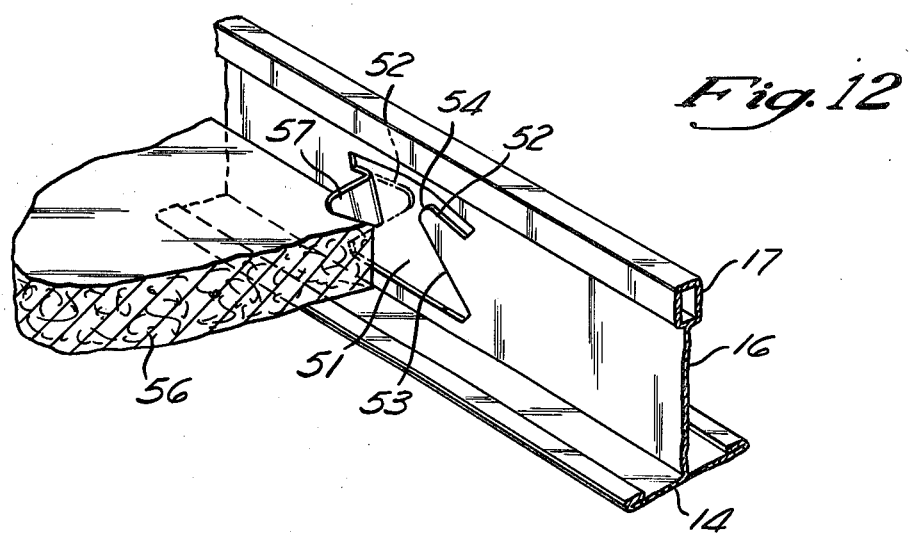
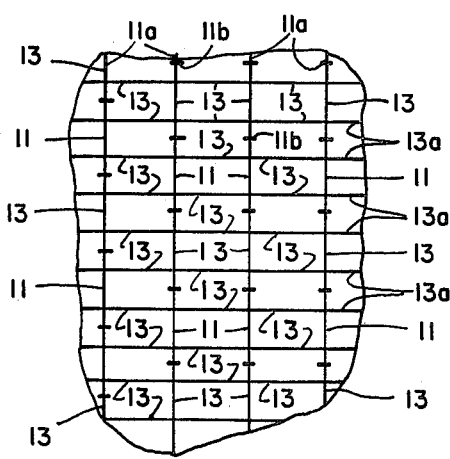

SUSPENSION CEILING SYSTEM

BACKGROUND OF THE INVENTION

This invention relates generally to suspension ceiling systems which provide a grid of inverted tee shaped members assembled to define panel openings in which ceiling panels are supported.

PRIOR ART

Generally the grids of suspension ceilings include two types of tee shaped members which are assembled to provide the grid. The first type of member is usually referred to as a main tee member and is provided with end connections arranged so that main tee members are connected at their ends to form main runs which are supported in parallel relationship from the building structure. Such end connections are normally arranged to connect only with similar or mating end connections on the other main tee members.

The other type of tee members is usually referred to as cross tees and are provided with end connections adapted to fit into openings formed in the web of main tees or cross tees and to be assembled so that they are supported on their ends between parallel main runs or cross runs. The end connectors for cross tees are usually arranged to either connect with the web at the cross tee opening or to connect with another cross tee end connector through a cross tee. Examples of the former type of cross tee end connector is illustrated in the U.S. Pat. Nos. 3,511,012; 3,584,904; and 3,746,379. An example of the latter type of end connector is illustrated in the U.S. Pat. No. 3,084,401. It is also known to provide the cross tees with end connectors which can be used in either manner so that the end connector can be connected to the web of the perpendicularly extending tee without a cross tee on the opposite side of the opening or connected with another cross tee through such opening. Examples of such an end connector are illustrated in the U.S. Pat. Nos. 3,501,185 and 3,922,829. The former of these two patents is assigned to the assignee of the present invention.

Another structure providing a connection of this last type is also disclosed and claimed in the pending application Ser. No. 713,287 filed Aug. 11, 1976 now U.S. Pat. No. 4,108,563 and also assigned to the assignee of the present invention. (McNenny, Pearne et al.) also assigned to the assignee of the present invention.

Grid systems of the type described above are often installed in buildings where the ceiling is continuous over large areas and extend past room walls. However, in other instances particularly in older buildings, suspension ceilings are installed in which the grid extends only to the walls of each room and does not extend past the walls. In the latter type of system in which room sizes and shapes vary widely, the ratio of numbers of main tees to cross tees required for a given installation varies with the shapes and sizes of the rooms. For example, long narrow rooms require a different ratio of main tee members to cross tee members than rooms which are more nearly square.

SUMMARY OF THE INVENTION

In accordance with the present invention a novel and improved grid system is provided in which the cross tee members are provided with end connectors which are compatible for connection in a number of different ways. The end connections of the cross tees can be connected to the end connections on the main tees to provide main runs assembled from alternate main tee members and cross tee members. The end connectors can also be connected into a cross tee opening in the web of the main tee members or cross tee members with or without a similar cross tee on the opposite side of the web. With such a structure greater flexibility is provided in the assembly of the grid and the grid can be assembled in a variety of shapes of rooms of a given area using substantially the same ratio of members of cross tees to main tees. Consequently, the grid can be marketed in packages consisting of a predetermined ratio of numbers of main tee members and cross tee members to produce a grid of a given area without substantial regard to the particular shape of the room in which the grid is to be installed.

Such grid tees can also be assembled in rooms of unusual shape where the main runs extend in one direction in one portion of the room and in another direction in other portions of a room.

In the illustrated embodiment the length of the main tee members is equal to the modular dimension of the grid plus the width of the face flange of the grid system. The length of the cross tee member is equal to the length of a grid module minus the width of a face flange of the grid system. Therefore, when cross tees are alternately assembled with main tees the modular length of the assembled main run is consistently maintained.

In the illustrated embodiment of this invention the grid tees are also provided with a novel and improved structure for holding ceiling panels against the face flange of the grid to prevent rattling or looseness in the assembled ceiling system.

BRIEF DESCRIPTION OF THE DRAWINGS

FIG. 1 is a fragmentary perspective view illustrating the ends of a cross tee and a main tee in an aligned position before connections of the two tees;

FIG. 2 is a perspective view similar to FIG. 1 illustrating the main tee and cross tee after connection;

FIG. 6 is a side elevation of a main tee end connection;

FIG. 7 is a longitudinal section taken along 7—7 of FIG. 2 illustrating a cross tee connected to a main tee;

FIG. 8 is a fragmentary side elevation of a cross tee end connector incorporating this invention;

FIG. 9 is a cross section taken generally along 9—9 of FIG. 5 illustrating two cross tees connected together through a cross tee mounting opening;

FIG. 10 is a side elevation of a main tee;

FIG. 11 is a side elevation of the cross tee;

FIG. 12 is a fragmentary perspective view of a novel and improved structure for locking a panel against the face flange of the tees to prevent looseness or rattling of such panel and, FIG. 13 is a schematic representation of a grid in accordance with the present invention.

DETAILED DESCRIPTION OF THE DRAWINGS

Figure 3:
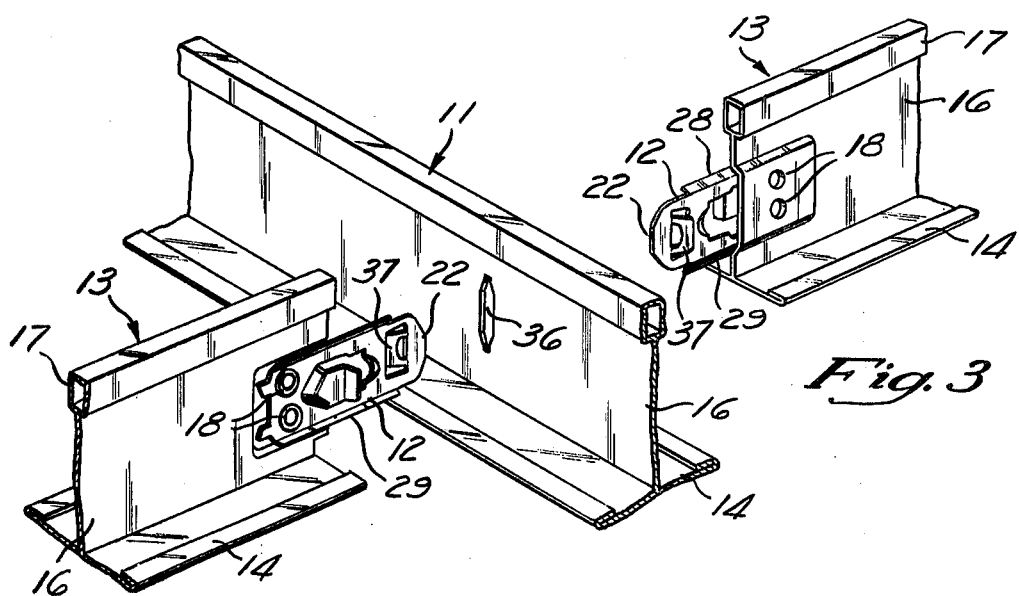
FIG. 3 is a fragmentary perspective view illustrating two cross tees aligned with a cross tee mounting opening with the cross tees properly aligned for connection but before such connection occurs.

In the illustrated embodiment there are two types of end connections both of which appear in FIG. 1. The first end connection 10 is provided on main tee members 11 and the second type of end connectors 12 is provided on cross tee members 13. It should be understood that each cross tee member 13 is provided with an identical end connector 12 at each of its ends and each of the main tees 11 is provided with an identical end connector 10 at each of its ends.

Both of the tee members 11 and 13 are similar in cross section and include a face flange 14 along their lower side, a central web section 16 extending upwardly from the center portion of the face flange and a bulb portion 17 at the top of the central web 16. It should be understood that this invention is not limited to the exact tee cross section illustrated and can be used with tee members having various types of conventional cross sectional shapes and which are formed in various manners known to those skilled in the art.

In the illustrated embodiment the end connector 10 is formed from the material of the central web 16 of the main tees 11. However, the cross tee end connectors 12 are formed as separate elements which are riveted at 18 to the central web of the cross tee members 13.

The illustrated main tee end connection includes an axially extending tab 21 which is laterally spaced from the plane of the central web 16 to form an axially extending pocket which receives the forward end 22 of the cross tee connector 12. The cross tee connector 12 is formed with an axially extending tab 23 which is also laterally displaced from the main plane of the cross tee end connector 12 to form another axially extending pocket to receive the forward end 24 of the main tee connector 10. The interlocking engagement of the two tabs 21 and 23 with the associated ends 22 and 24 respectively maintains lateral alignment between the two end connectors when they are connected.

The main tee end connector 10 is also formed with a pair of axially extending generally V-shaped ribs 26 and 27 which receive inclined flanges 28 and 29 on the end connectors 12 to assist in guiding the two connectors as they are assembled and to establish and maintain vertical alignment between the connected tee members 11 and 13.

When the cross tee connector 12 is assembled and connected with a main tee connector 10, the face 30 of a lateral protrusion 31 engages a lateral face 32 provided by the main tee connector 10 and prevents axial separation between the parts. When assembled the ends of the face flanges 14 and the bulbs 17 of the two members 11 and 14 engage to prevent further axial movement toward each other. Consequently, when the two end connectors 10 and 12 are assembled as illustrated in FIGS. 2 and 7 the main tee 11 is rigidly and permanently connected to the cross tees 13 and is held in alignment and against relative lateral movement in all directions.

When assembling a main run of the grid it is merely necessary to connect alternate cross tee members and main tee members together at their ends until a main run of the desired length is provided. As mentioned previously such main runs are usually suspended from the building structure in a parallel manner with the proper spacing between the main runs.

Figure 4:
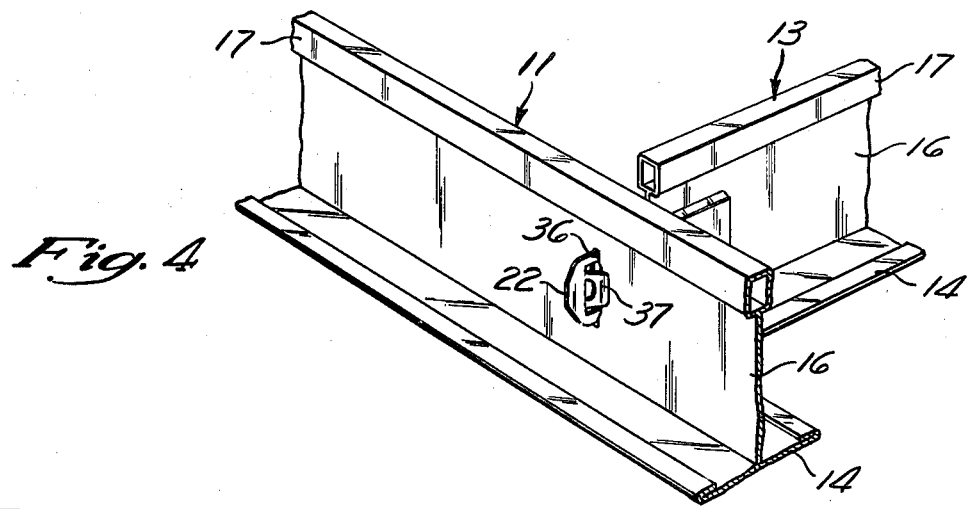
FIG. 4 is a perspective view similar to FIG. 3 illustrating a single cross tee connected through a cross tee mounting opening illustrating the manner in which a positive connection is provided.
Figure 5:
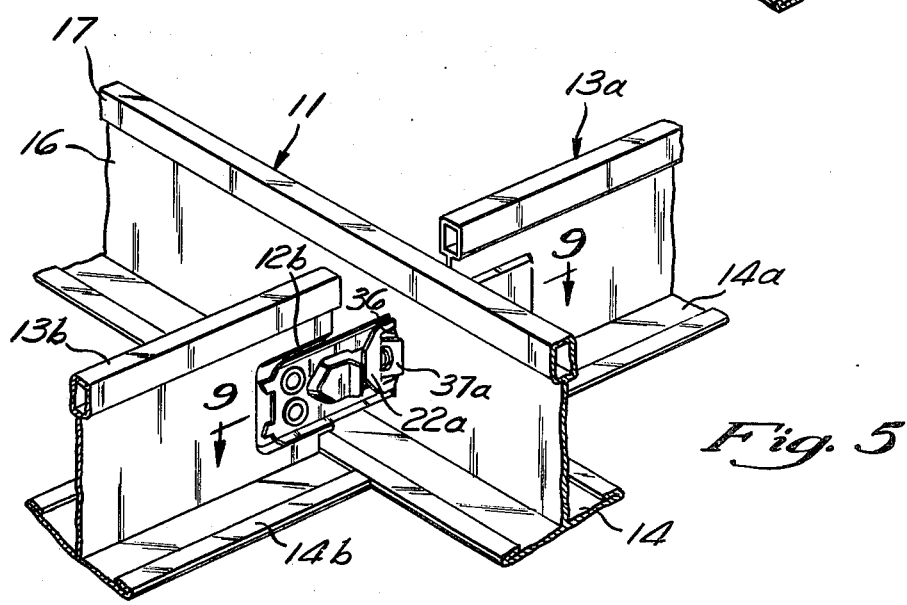
FIG. 5 is a perspective view similar to FIGS. 3 and 4 but illustrating the connection with two cross tees interconnected through a cross tee mounting opening.

Referring to FIGS. 3 through 5 the cross tees 13 can also be connected to a main tee or cross tee through a cross tee mounting opening 36 formed in the web 16 of both the main tees 11 and the cross tees 13. The cross tee mounting openings 36 are formed at intervals along the lengths of both the main tee and cross tee members as described below.

The structural arrangement of the cross tee end connectors 12 as it functions for connection through a cross tee mounting opening is substantially described and claimed in the pending application mentioned above and such application is incorporated herein by reference.

When one of the cross tee end connectors 12 is moved axially from the position of FIG. 3 to the position of FIG. 4 so that the end 22 thereto extends through the cross tee mounting opening 36, a lateral tab 37 projects laterally beyond the adjacent edge of the opening 36 and serves to lock the end connector in the assembled position of FIG. 4. The ends of the inclined flanges 28 and 29 engage the flange 16 on the side thereof opposite the tab 37 and cooperate with such tab to axially fix the cross tee 13 of FIG. 4 with respect to the web 16. In such position the face flange 14 of the cross tee 13 abuts the side of the face flange 14 of the main tee 11 so that a finished appearance is provided by the face flanges of the connected grid members. It should be understood that a similar connection can be made between a cross tee 13 and another cross tee which is assembled in either a main run or a cross run. Because the end connector 12 can be assembled in a cross tee mounting opening 36 by itself the cross tees can be connected or installed even in locations where a similar cross tee is not mounted on the opposite side of the cross tee mounting opening 36.

When two cross tees are connected on opposite sides of the main tee as illustrated in FIGS. 5 and 9 the two ends 22 of the cross tee end connectors 12 extends through the opening 36 from opposite sides. The locking connection that is produced is best illustrated in FIG. 9 wherein the cross tee end connection 12 on the right side of the figure is designated as 12a and the cross tee end connector on the left side of the figure is designated as 12b. The mounting of the two end connectors 12a and 12b on the associated webs 16 of the cross tee members 13a and 13b has not been illustrated in FIG. 9 for purposes of simplification. However, it should be understood that a rivet type structure as illustrated in the other figures is preferably utilized.

When the two end connectors are connected as illustrated in FIG. 9 the axially extending tabs 23 do not perform any function and do not engage any other part. The ends of the two connectors 22a and 22b extend through the mounting opening 36 from opposite sides and extend past the protrusions 31a and 31b of the opposed end connector so that the end faces 30a and 30b are in alignment with the lateral edges 41a and 41b formed by a central cut-out in the laterally extending tabs 37a and 37b. Therefore, a double lock system is provided in which the two end connectors 16a and 16b are locked on each side of the opening 36. Preferably the structure is arranged so that when the two end connectors are connected as illustrated in FIG. 9 the tabs 37a and 37b do not engage the central web 16 of the main tee 11. When connected the face flanges 14a and 14b of the cross tees 13a and 13b are adjacent to the opposite sides of the face flange 14 of the main tee 11 and the ends of the inclined flanges 28 and 29 are against the central web 16.

Generally, suspension ceiling grids are constructed for assembly to accept panels which are two feet by four feet. In such grids the distance between the central webs 16 bounding the panel opening is substantially two feet by four feet and the face flanges, if they are one inch wide are spaced apart across the opening by approximately twenty three inches and and forty seven inches. To assemble such grids the cross tee members are preferably manufactured to have a face flange 14 forty seven inches long and the main tee members are constructed to have a face flange 14 length forty nine inches long. When a cross tee 13 having such a dimension is connected to the end of a main tee 11 the total length of the two tees is ninety six inches or an even eight feet in spite of the fact that the cross tee is less than four feet long.

The cross tee mounting openings are usually located at intervals which are even fractions of two feet. As illustrated in FIG. 10 the main tee 11 is formed with four cross tee openings 36 which are spaced twelve inches apart. The cross tee openings 36a adjacent to the end of the main tee 11 are spaced from such ends by six and one half inches. Referring to FIG. 11 the cross tee 13 is formed with five cross tee openings 36. The cross tee openings 36b are spaced from the ends of the face flange 14 of the cross tee by five and one half inches. The cross tee openings 36c are spaced from each other by twelve inches and are also spaced from the cross tee openings 36b by twelve inches. An additional cross tee opening 36d is provided in the center of the cross tee 13 for reasons discussed below.

When a cross tee is assembled with the main tee to produce a main run 11a the cross tee openings 36b at the ends of the cross tee are spaced from the cross tee openings 36a on the main tee by twelve inches. Consequently, in an assembled main run a cross tee opening is provided at one foot intervals throughout the entire length of the main run 11a so that cross tees can be assembled to produce cross runs 13a which are parallel and spaced apart by a distance of either two feet or four feet but can be located with respect to the ends of the room at one foot intervals depending upon the cross tee opening selected for assembly. In FIG. 13 the connection between the main tees 11 and cross tees 13 within each of the main runs 11a is schematically represented by a cross mark 11b. It should be noted that such connections 11b are spaced from the cross runs 13a.

When it is desired to install the panels so that they extend lengthwise between the main runs, the cross tees are installed so that cross runs exist at two foot intervals and the main runs are four feet apart. Such arrangement divides the four foot square module into two panel openings having their length dimension perpendicular to the main runs. In other instances, where it is desired to have the panel length aligned with the main runs, the cross tees are installed on the main runs at four foot intervals to again produce the four foot square module. In such instance additional cross tees are installed in the cross runs at the cross tee openings 36d in the cross runs to produce runs consisting entirely of cross tees extending in the same direction as the main runs equally spaced from the main runs so that there are two panel openings between each main run with the four foot dimension of the panel openings extending in the same direction as the main run.

In general the main runs are installed so that they extend perpendicular to the structural members of the building such as the joists. The present invention is particularly useful for installation in rooms where the direction of the joists is not consistent throughout an entire area. Such conditions sometimes exist, for example, in L-shaped rooms in which the joists extend in one direction in one portion of the room and in another direction in other portions of the room. When installing the ceiling grid in such area, first main runs can be assembled and suspended to run in one direction in one zone of the grid and assembled with second main runs extending in another direction in another zone. In such grids the ends of the second main runs are connected into cross tee openings in the first main runs so that the main runs extend in one direction in one zone and perpendicular to such direction in another zone. Since the usual cross tee at the end of the second main run would place a main run joint at a modular dimension from the end, it is necessary to provide adapter cross tees for assembly at the end of the second main runs. Such adapter cross tees are similar to the regular cross tees but have a different length. For example, in a grid having a four foor module, as discussed above, the adapter cross tee may have a length of eleven inches.

FIG. 12 illustrates a panel hold down structure which is preferably incorporated in grid tees in accordance with the present invention. Such structure is not illustrated in the other figures for purposes of simplification, but is preferably provided at intervals along the length of both of the main tees and cross tees. The illustrated hold down structure is formed by a cut-out 51 in the central web 16 shaped to provide a tongue 52 having a lower edge 53 which is inclined upwardly with respect to the lengthwise axis of the grid member to a free end at 54. The cut-out 51 is shaped to provide two opposed tongues 52 of similar shape. With such structure after a panel 56 is installed against the face flange 14 one of the tongues is bent laterally over the edge of the panel 56 to hold the panel tightly down against the face flange to eliminate any panel looseness. Usually, one tongue is bent over as illustrated at 57 to hold down one panel and the other tongue is bent in the opposite direction over the panel extending along the opposite side of the central web 16, so that panels on both sides of the web are secured against looseness. Because the tongue 52 is formed with an inclined lower edge a given hold down tongue 52 can be used with panels of various thicknesses. If the panel is relatively thin the bent line occurs lower along the inclined edge 53. On the other hand, if the panel is relatively thick the bent line occurs well up along the edge 53 as illustrated. With this structure satisfactory operation is provided for locking or securing panels of substantially different thicknesses without modifying the size and shape of the locking structure.

As discussed above the present invention is particularly suited for packaging and marketing for installation of grids in rooms of various sizes and shapes. For example, a grid package intended to produce a grid having an area of up to thirty two square feet would include two main tee members forty nine inches long and ten cross tee members forty seven inches long. If the required grid, for example, must have an area of one hundred and fifty square feet, five such packages would be utilized. If the room shape in which the grids are to be installed requires a greater total length of main runs, a greater number of cross tees are used in assembling such main runs. On the other hand, if the room shape is such that the total length of main runs is relatively small, more cross tees are then installed to produce cross runs and a lessor number of cross tees are used in the main runs. The fact that the cross tees can be used in either cross runs or main runs makes it practical to package and market a grid incorporating this invention for use without particular regard to the shape of the room in which the grid is to be installed.

Although a preferred embodiment of this invention is illustrated it is to be understood that various modifications and rearrangements may be resorted to without departing from the scope of the invention disclosed and claimed.

We claim:

1. A suspension ceiling system or the like adapted to be assembled to form a grid defining panel openings comprising main tee members each having a face flange, first end connectors at each end and lateral openings intermediate its ends, and cross tee members each having a face flange, second end connectors at its ends and lateral openings intermediate its ends, said first end connectors and said second end connectors being endwise connectible to provide main runs having alternate main tee and cross tee members, said second end connectors being endwise connectible at said lateral openings to provide cross runs extending perpendicular to said main runs, said cross tee members having a length corresponding to a dimension of said panel openings minus the width of a flange, said main tee members having a length corresponding to a panel opening dimension plus the width of a flange whereby when said main tees and cross tees are endwise interconnected to form main runs and said cross tees are connected between said main runs the panel opening dimensions are maintained.

2. A suspension ceiling as set forth in claim 1 wherein said second end connectors are connectible through said lateral openings without a second end connector extending through the same lateral opening from the opposite side thereof.

3. A suspension ceiling system as set forth in claim 1 wherein said second end connectors are connectible with each other when two second end connectors are inserted from opposite sides through one of said lateral openings.

4. A suspension ceiling system as set forth in claim 3 wherein said second end connectors are connectible through said lateral openings without another second end connector extending through the same lateral opening from the opposite side.

5. A suspension ceiling system as set forth in claim 1 wherein said tee members may be assembled in a grid with first main runs consisting of alternate main tee members and cross tee members extending in one direction along one portion of said grid, and with second main runs consisting of alternate main tee members and cross tee members extending perpendicular to said first main run member in which cross tees at the ends of said second main runs are connected at their ends to lateral openings in said first main runs.

6. A suspension ceiling system as set forth in claim 1 wherein said cross tee members and main tee members are supplied in groups with a first predetermined number of main tee members and second predetermined number of cross tee members, and said cross tee members can be selectively assembled in main runs or cross runs to produce grids of various shapes.

7. A suspension ceiling system as set forth in claim 6 wherein said face flanges are approximately one inch wide, said main tees are approximately forty nine inches long, and said cross tees are approximately forty seven inches long.

8. A suspension ceiling system as set forth in claim 7 wherein said group includes approximately five times as many cross tee members as main tee members.

9. A suspension ceiling as set forth in claim 1 wherein said main tees and cross tees are connectible in main runs consisting of alternate main tee members and cross tee members, and said main runs provide lateral openings at uniform spacing along the entire length of the said main runs.

10. A suspension ceiling system as set forth in claim 9 wherein the spacing between the ends of the face flanges of each cross tee member and the closest lateral opening therein is equal to one half of said uniform spacing minus one half of the width of a face flange, and the spacing between the ends of the face flange of each main tee member from the closest lateral opening therein is equal to one half of said uniform spacing plus one half the width of a face flange.

11. A suspension ceiling system as set forth in claim 1 wherein said first end connectors have a first structure and said second end connectors have a second structure different than said first structure.

* * * * *